Patented Oct. 3, 1922.

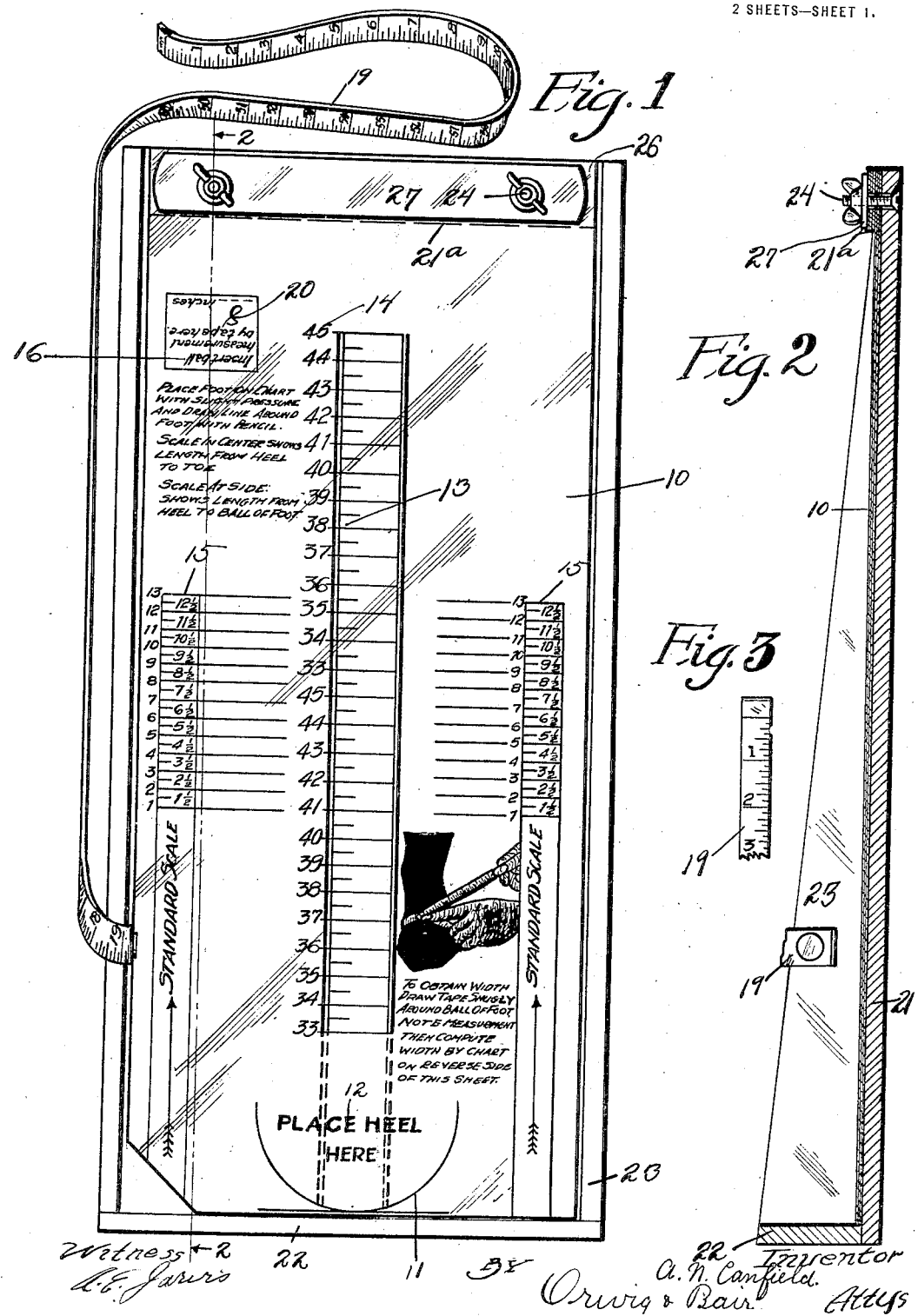

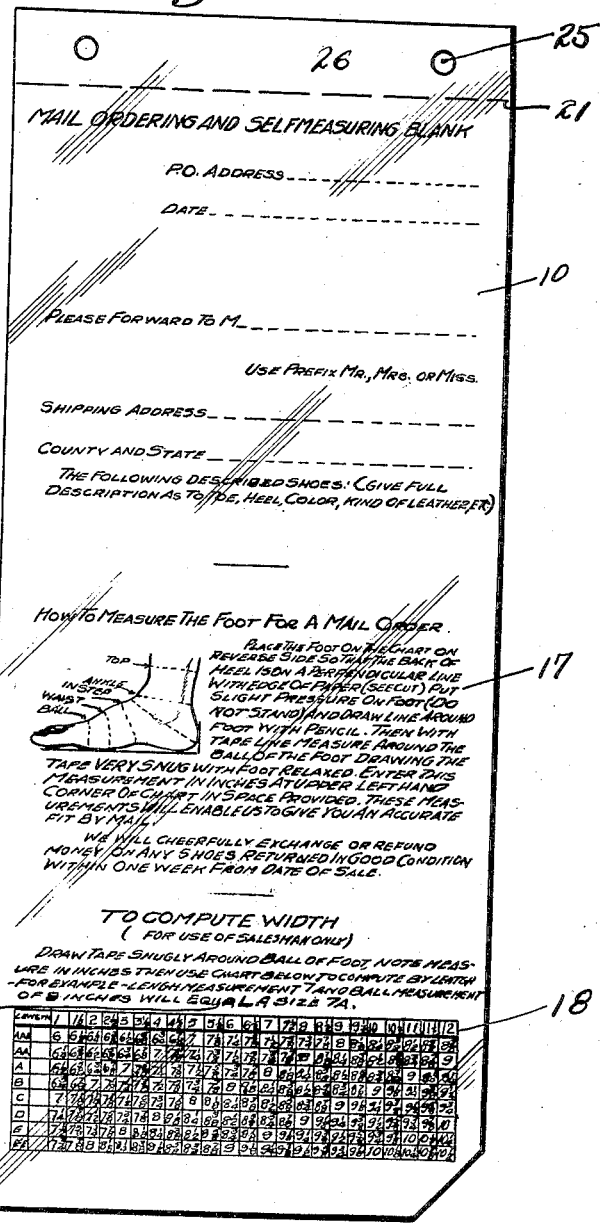

1,430,794

UNITED STATES PATENT OFFICE.

ALLEN N. CANFIELD, OF DES MOINES, IOWA, ASSIGNOR TO FIT-RITE COMPANY, A PARTNERSHIP COMPOSED OF ALLEN N. CANFIELD, ARTHUR B. CRANDALL, AND JOHN H. BRUNK, ALL OF DES MOINES, IOWA.

FOOT-MEASURING DEVICE FOR FITTING SHOES.

Application filed January 6, 1920. Serial No. 349,825.

*To all whom it may concern:*

Be it known that I, ALLEN N. CANFIELD, a citizen of the United States, and a resident of Des Moines, in the county of Polk and State of Iowa, have invented a certain new and useful Foot-Measuring Device for Fitting Shoes, of which the following is a specification.

The object of my invention is to provide a device for accurately measuring the foot for fitting shoes.

More particularly it is my object to provide such a device including a chart having indicated thereon a standard scale for determining the total length of the foot, said scale being preferably arranged near the longitudinal center of the chart and having spaced from said scale on opposite sides thereof corresponding scales for determining the length of the arch from the heel to the ball of the foot.

A further object is to provide in such a chart a suitable place for marking the last measurement mentioned.

An important object of my invention is to provide such a chart designed for measurements as above indicated, and adapted to be used in connection with a measurement of the circumference of the foot at the ball, and to provide on said chart a table whereby when the length of the arch from the heel to the ball of the foot is determined and the circumference of the foot at the ball is determined and whereby the foot may be fitted with the shoe of the proper width.

Another object is to provide such a chart having suitable perforated lines, and having indicating legends and suitable blanks for keeping the customer's record.

A further object is to provide in connection with a plurality of such charts arranged in a pad, a support or frame for the pad or charts having at one end a stop member, against which the heel may be placed, and having means for detachably fastening the pad of charts thereto, and having preferably a measuring tape secured thereto.

With these and other objects in view my invention consists in the construction, arrangement and combination of the various parts of the device, whereby the objects contemplated are attained as hereinafter more fully set forth, pointed out in my claims and illustrated in the accompanying drawings, in which:

Figure 1 is a plan view of a pad of my charts supported on a frame.

Figure 2 is a sectional view taken on the line 2—2 of Figure 1.

Figure 3 shows a detail view of a portion of the tape.

Figure 4 shows a plan view of the reverse side of the chart.

The proper fitting of shoes is a rather difficult process. Heretofore it has been the custom, in many stores, to find the length of the foot for determining generally the size of the shoe in length, and then fitting for width by trying one shoe after another.

In some places it has been the custom to measure for length and also for width at the ball of the foot and thereby determine both the length and width of the foot to be fitted.

The foot cannot in many instances be properly fitted by simply determining the length of the foot and the breadth at the ball, for the reason that in some instances the total length of foot does not properly indicate the proper length of shoe for fitting the foot, because the toes may be deformed or for other reasons, and the breadth of the foot at the ball cannot accurately indicate the proper width of shoe required, for the reason that some feet are thicker or thinner than others, and in determining what is the proper width of shoe further measurement is necessary.

I believe I am the first to provide means for ascertaining the circumference of the foot at the ball, which is an element which should be taken into consideration in properly fitting a shoe.

For instance, in fitting two feet, which may be of the same breadth at the ball, one foot may be considerably thicker than the other, thereby requiring a shoe of greater width.

In providing means for securing proper measurements for accurately fitting a foot, I have provided the chart shown in Figures 1 and 4 of my drawings herewith.

I provide a sheet indicated in the drawings by the reference character 10, which is preferably of paper and has marked thereon at one end indicating means 11 for showing where the heel of the foot should be placed on the chart for making a proper measurement.

The chart also has a suitable legend 12 such as "Place heel here." The mark 11 may be a curved line, as shown, and preferably arranged at such a point so that the center of the back of the heel will be at the edge of the sheet 10.

Extending from such end of the sheet toward the other end, and preferably spaced from the side edges of the sheet is a scale 13, adjacent to which are indicating characters or numbers 14 commonly used by shoe men for indicating measurements.

Any suitable indicating numbers could be used. In the scale used by my charts, for instance, the numeral 43 indicates a number 11 shoe in size. 36 indicates a number 4 and so on.

Spaced laterally from the scale 13 on opposite sides thereof are two small scales 15. Two of the scales 15 are used, so that the chart may be readily adapted for measuring both the right and left foot. The scales 15 are used for determining the length of the arch from the heel to the ball of the foot.

Near the end of the chart on the side thereof which has the scale just described and opposite the end having the mark 11 is arranged a legend 16 such as "Insert ball measurement by tape here," and a blank space is provided for marking down such measurement. The legend is so arranged that it may be conveniently read by the salesman fitting the customer.

On the reverse side of the sheet 10 are instructions 17 for making measurements.

Suitably located on the chart as, for instance, on the reverse side is a table 18 shown in Figure 4, having at its left-hand side a column indicating the ordinary widths of shoes.

In the upper horizontal line are characters indicating the length (size of the shoe), and in the other vertical column are characters indicating circumferential measurements of the ball of the foot.

In measuring a foot for fitting a shoe thereto, the foot is placed on the reverse side of the sheet 10 with the heel at the indicating point, and the salesman preferably marks around the foot with a pencil.

It will be seen that he can readily determine the length of the foot by means of the scale 13.

The length of the arch from the heel to the ball will be found on the scale 15, and will be indicated at the greatest width of the foot, where the foot is normal.

This point should be at the joint of the large toe, and the joint should be the point taken for the measurement, if, for any reason, the foot should be enlarged at any point in the rear of such joint.

The salesman should then measure the foot at the ball with the tape 19, hereinafter more fully referred to, for determining the circumference in proper units such as inches.

The circumference is then marked down, as at 20, and the blank indicated adjacent to the legend 16.

The sheets 10 are perforated near the end opposite the mark 11 along the line 21$^a$. The sheet is torn from the stub after the measurement has been secured as indicated, and turned over whereupon the salesman may use the chart 18 for determining the proper width of the shoe.

In many instances, however, the total length of the foot is not a proper criterion for determining the length or size of shoe to be found, and a more accurate fit is secured by using the scale 15, whereby the length of the foot from heel to ball is determined. If the size indicated on the scale 13 and the size indicated on the scale 15 are not the same I preferably fit the foot with the scale 15. The use of the different scales offers a check, however, for obtaining accurate measurements.

Assuming that the length or size indicated by the measurement is 7, then the salesman uses the chart 18 and finds the 7 at the top of the scale 18, and then runs down the column until he reaches the 8 (circumferential measurement of the ball), and then moving horizontally to the left finds that the width indicated is "A". The salesman then knows that the foot will best be fitted by a 7 shoe of A width.

It will be seen that with my device I obtain an accurate measurement of the length of the arch from the heel to the ball, which is the measurement to be used to properly determine the length of the foot to be fitted, and that instead of using the breadth of the foot to determine the width of the shoe, which in many instances is unsatisfactory, because of the difference in thickness of feet, I determine the proper width of shoe by ascertaining the circumferential measurements of the foot at the ball, and with these measurements I can accurately fit the shoe to the foot in all cases, unless the foot is deformed.

For convenience in using my charts, I arrange them in pads as indicated particularly in Figure 2 and place them in a frame consisting of a base 21 and the rear upright member 22, against which the heel may be placed, and side members 23 which are inclined from the upper edge of the rear member 22 forwardly and downwardly as indicated in Figure 2.

The pad is preferably mounted and held in the frame by means of screw-bolts 24 in the forward end of the frame.

These bolts 24 are extended through holes 25 in the stubs 26 of the sheets 10. On top of the pad I preferably place a transverse plate 27. Wing nuts 28 are then placed on the upper ends of the screw-bolts.

The frame furnishes a convenient support for the pad of sheets 10. The tape 19 may be fastened at a convenient point on the frame just described, as indicated in Figure 1. I preferably fasten the tape 19 to the frame simply in order that it may be always available for use when needed and will not be lost or mislaid.

By arranging the parts as described they are always together and ready for use.

The sheets 10 have a rigid support, so that they are conveniently held during the measuring process.

Some changes may be made in the construction and arrangement of the parts of my improved device, without departing from the essential features and purposes of my invention, and it is my intention to cover by my claim any modified forms of structure or use of mechanical equivalents which may be included within its scope.

I claim as my invention:

In a foot measuring device, a foot support having a rear wall adapted to serve as a heel stop, a flexible measuring tape secured to said support, a fastening clamp on said support at the opposite end thereof from said stop, a pad of sheets secured to said support by means of said clamp, each having on its upper surface a central, longitudinally arranged foot length scale and having spaced laterally therefrom opposite longitudinally arranged scales for indicating the length of the foot from heel to ball and having near its fastened end a space and a legend "Insert ball measurements here," each sheet having on its reverse side a table indicating the shoe sizes and widths corresponding to the various foot lengths and ball circumference measurements.

ALLEN N. CANFIELD.